(12) United States Patent
Wang et al.

(10) Patent No.: US 8,879,722 B1
(45) Date of Patent: Nov. 4, 2014

(54) WIRELESS COMMUNICATION EARPIECE

(71) Applicant: Motorola Mobility LLC, Libertyville, IL (US)

(72) Inventors: Dennis D. Wang, Northbrook, IL (US); Vijay L. Asrani, Round Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/970,757

(22) Filed: Aug. 20, 2013

(51) Int. Cl.
*H04M 1/00* (2006.01)
*H04R 1/10* (2006.01)

(52) U.S. Cl.
CPC ............ *H04R 1/1058* (2013.01); *H04R 1/1091* (2013.01)
USPC ......................... 379/430; 455/575.2; 381/375

(58) Field of Classification Search
CPC ...... H04R 1/10; H04R 1/1008; H04R 1/1016; H04R 1/105; H04R 1/1058; H04R 1/1075; H04R 25/02; H04R 25/55; H04R 25/554; H04R 25/60; H04R 25/652; H04M 1/05; H04M 1/6066; H04M 2205/041; H04M 2420/07; H04M 2499/11
USPC ........ 379/430; 455/575.2; 381/370, 374, 375, 381/376, 379, 381, 312, 330
See application file for complete search history.

(56) References Cited

U.S. PATENT DOCUMENTS

| | | | |
|---|---|---|---|
| 8,135,157 B2 | 3/2012 | Tarvonen et al. | |
| 8,285,208 B2 | 10/2012 | Terlizzi | |
| 8,320,974 B2 | 11/2012 | Nicholson | |
| 8,385,039 B2 | 2/2013 | Rothkopf | |
| 8,401,178 B2 | 3/2013 | Chen et al. | |
| 8,406,418 B2 | 3/2013 | Birch | |
| 8,411,880 B2 | 4/2013 | Wang et al. | |
| 2007/0147630 A1 | 6/2007 | Chiloyan | |
| 2008/0016245 A1 | 1/2008 | Cunningham et al. | |
| 2008/0201138 A1* | 8/2008 | Visser et al. | 704/227 |
| 2009/0120429 A1* | 5/2009 | Fowler | 126/704 |
| 2011/0125063 A1* | 5/2011 | Shalon et al. | 600/590 |
| 2012/0114154 A1* | 5/2012 | Abrahamsson | 381/309 |
| 2012/0243723 A1* | 9/2012 | Halkosaari et al. | 381/379 |

* cited by examiner

*Primary Examiner* — Tuan D Nguyen
(74) *Attorney, Agent, or Firm* — Morris & Kamlay LLP

(57) ABSTRACT

An apparatus is a wireless communication earpiece. The wireless communication earpiece includes an earmount portion that is capable of positioning the apparatus at an ear of a user, a movable portion that is movable to one of a plurality of positions with reference to the earmount portion, a position sensor that detects a selected position of the plurality of positions of the earmount portion, a plurality of microphones, and a digital signal processing function. The digital signal processing function selects one of a plurality of digital signal processes in response to the selected position and uses the selected one of the digital signal processes to process audio signals from the plurality of microphones.

4 Claims, 3 Drawing Sheets

US 8,879,722 B1

WIRELESS COMMUNICATION EARPIECE

FIELD OF THE INVENTION

The present invention relates generally to wireless communication devices, and more specifically to wireless communication earpieces that are adaptable to a left or right ear.

BACKGROUND

Wireless communication earpieces are well known. Many such devices are designed to couple to a wide area portable communication device, such as a cell phone, by Bluetooth® (a trademark registered to Bluetooth SIG, Inc., Kirkland, Wash., USA). The use of Bluetooth allows the electronics in the earpiece to be quite small and yet audibly robust, and provides both close range audible reception (via an earbud speaker) and audible transmission (using one or more microphones). Some wireless communication earpieces have parts that move with reference to an ear hook portion.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments that include the claimed invention, and explain various principles and advantages of those embodiments.

Figure 1:
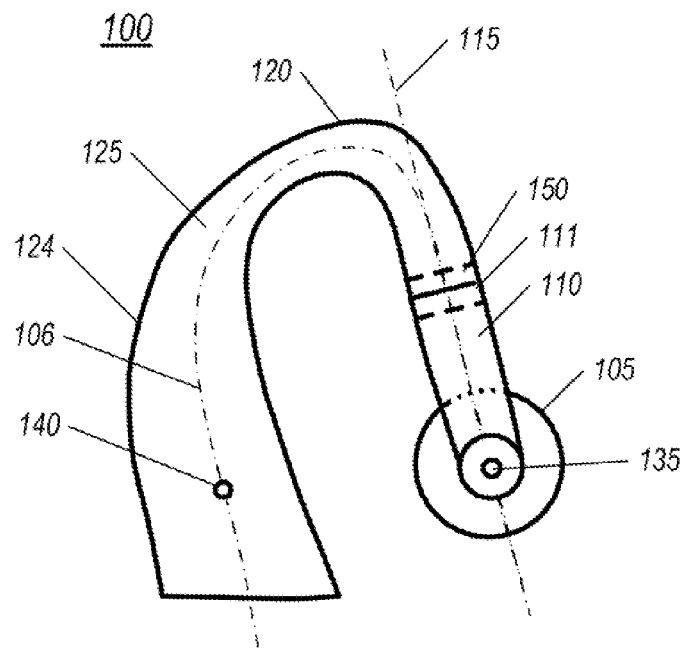
FIGS. 1-3, are outline diagrams of a first wireless communication earpiece.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the following embodiments, it should be observed that the embodiments reside primarily in combinations of apparatus components related to optimizing microphone performance in a wireless communication earpiece. This is accomplished by determining a position of a portion of the earpiece that is movable with reference to a portion that is substantially fixed with reference to a user's ear, such as an earhook, and selecting a digital signal process in response to the selected position of the portion that is movable Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
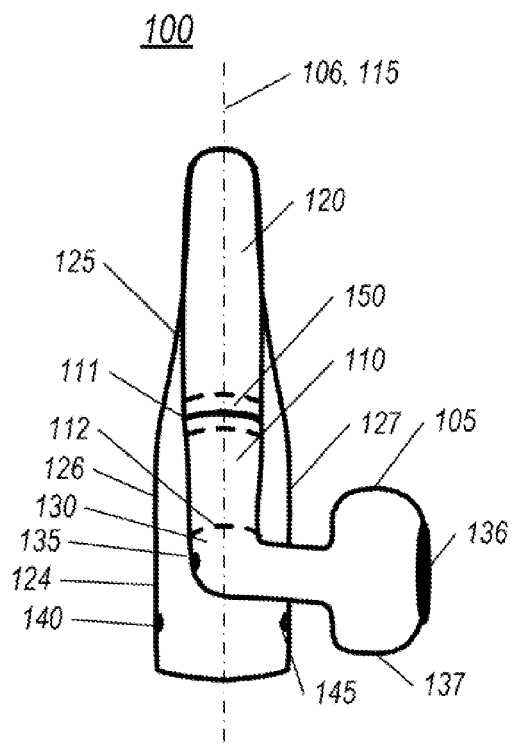
Figure 3:
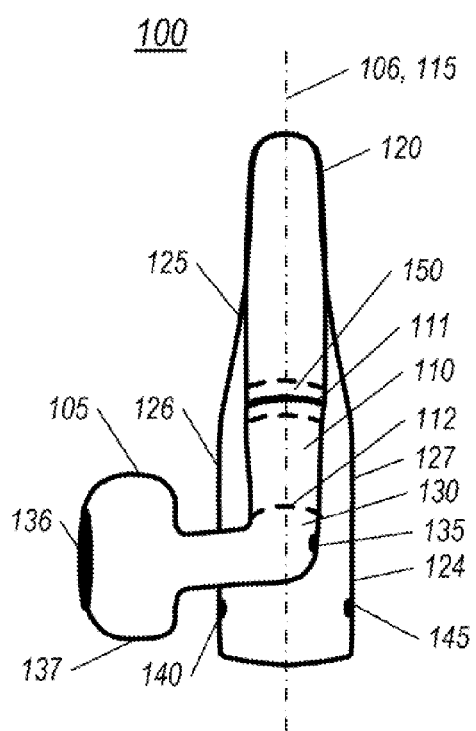

Referring to FIGS. 1-3, outline diagrams of a wireless communication earpiece 100 are shown, in accordance with certain embodiments. "Wireless communication earpieces" will be more simply referred to hereafter as earpieces. The earpiece is shown in FIG. 1 from the right side (head side) of the earpiece 100 when it is configured for use on the right ear. FIG. 2 shows the earpiece 100 from the front when it is configured for the right ear position. FIG. 3 shows the earpiece 100 from the front when it is configured for the left ear position. The earpiece 100 comprises an earbud 105. For the purposes of this document the earbud 105 is a portion of the earpiece 100 that is designed so that it can be rotationally positioned to direct audio from the earpiece 100 into the ear canal for either a right ear or a left ear. In accordance with certain embodiments, the earbud 105 of earpiece 100 is fixedly mounted to a portion of the earpiece 100 herein identified as a post 110. The post 110 is rotatably coupled to the remainder of the earpiece 100, which is also called the earhook or earmount portion, at a first rotational coupling 111 and can be manually rotated around an axis 115 of the first rotational coupling 111 to at least two positions that are approximately 180 degrees apart. The earbud 105 is projected from the post 110 at approximately 90 degrees with reference to the axis of rotation 115 The two earbud positions are the positions illustrated in FIGS. 2 and 3, and are named the right ear position (FIG. 2) and the left ear position (FIG. 3). "Approximately 180 degrees" means up to 220 degrees in some embodiments. In certain embodiments the first rotational coupling 111 may be described as being at a front end of a crossover portion 120 of the earpiece 100. The right and left ear positions of the earbud 105 may be described as approximately plus and minus 90 degrees of the earbud projection with reference to a plane of the longitudinal axis 106 of the earpiece 100. For earpieces that differ from the one illustrated in FIGS. 1-3, in which the longitudinal axis does not lie in a plane, the plane of the longitudinal axis refers to a plane from which the longitudinal axis has a minimum deviation as determined by a mathematical least square method. Approximately 90 degrees means between 75 and 105 degrees. The earbud 105 may comprise a microphone 135. The microphone 135 in FIGS. 1-3 is shown disposed at a position that is opposite the earbud speaker 136, but could be located at another position on the earbud, such as the bottom 137.

Another portion of the earpiece 100 is the earmount portion 125. The earmount portion 125 may be positioned primarily behind the ear in many embodiments, but could have other shapes. For example, the earmount portion 125 may comprise housing portions that conform to the helix and/or triangular fossa of the pinna of the ear, for better positioning of the earpiece 100. The earmount portion 125 may be described as portion of the earpiece that is fixed relative to a user's head when in normal use. The earmount portion 125 comprises a housing 124 which has a right side 126 and a left side 127, and may further comprise a right microphone 140, a left microphone 145. In some embodiments, the first rotational coupling 111 may be located higher or lower than illustrated in FIG. 1. In certain embodiments, there may be substantially no post 110; the earbud 105 in these embodiments may be rotatably coupled directly to the front end of the earmount portion 125 as shown by dotted rotatable coupling location 112 in FIGS. 2-3. The earbud 105 may more generally be described as being rotationally coupled to the earmount portion 125 and projecting from a low front end 130 of the earmount portion 125. The earbud 105 projects from the low front end 130 of the earpiece 100 at an angle of approximately 90 degrees with reference to the longitudinal axis 106 of the earpiece 100 at the rotational coupling 111. In some embodiments, approximately 90 degrees means between 75 degrees and 105 degrees. In some embodiments, the earbud 105 may have one or both of a third and fourth rotational position. These positions are between the left ear position and the right ear position. In the third position the earbud 105 is pointed towards the earmount portion 125 of the earpiece 100. In the fourth position the earbud 105 is pointed away from the earmount portion 125 of the earpiece 100. These positions may be used as off positions, in which case the off position is electrically sensed and used to power down the earpiece 100. Audio coupled by the earbud 105 to the ear is typically generated by a speaker 136 within the earbud 105. The earpiece 100 comprises a position sensor 150 disposed at the rotational coupling 111, as indicated by dotted lines on either side of the rotational coupling 111 (or wherever the rotational coupling is located, such as position 112) that is capable of electrically indicating which of the left and right ear positions (and in those embodiments having additional positions, which of all the positions) the earbud 105 is in.

Figure 4:
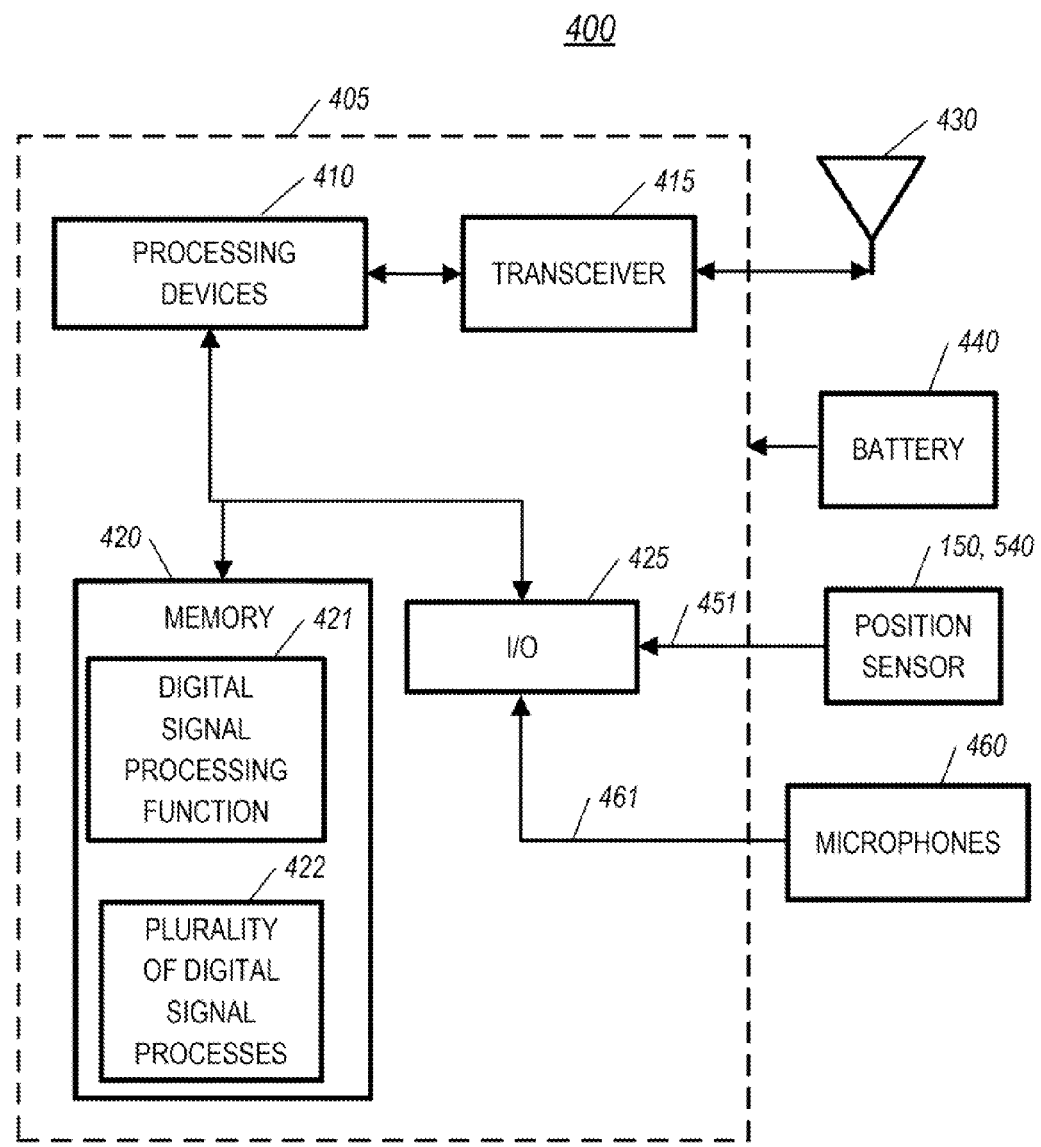
FIG. 4 is an electronic block diagram of the first and second wireless communication earpieces.

Referring to FIG. 4, an electronic block diagram 400 of the earpiece 100 is shown, in accordance with certain embodiments. In addition to the items described above with reference to FIGS. 1-3, the earpiece 100 may comprise an electronics module 405, an antenna 430, a battery 440, and a plurality of microphones 460. The electronics module 405, the antenna 430, and the battery 405 may be disposed in the earmount portion 125. The plurality of microphones 460 may be any two or more of microphones 135, 140, 145, or other microphone(s) disposed in or on earpiece 100. The electronics module 405 comprises one or more processing devices 410, each of which may include such sub-functions as central processing units, cache memory, instruction decoders, just to name a few. The processing devices 410 execute program instructions which could be located within the processing devices 410 in the form of programmable read only memory, or may be located in a memory 420 to which the processors 410 are bi-directionally coupled. The processors 410 may include internal input/output interface circuitry and/or may be coupled to separate input/output interface circuitry 425. The internal and/or separate input/output interface circuitry may interface to devices such as buttons, a speaker output, and LED indicators, and further couples to the position sensor 150 and the plurality of microphones 460. The internal and/or separate input/output interface circuitry may convert analog signals 461 from the plurality of microphones 460 to digital signals that are suitable for digital processing. The processing devices 410 are further coupled to a radio transceiver 415. The radio transceiver 415 is a radio receive-transmit function. The radio transceiver 415 is bi-directionally coupled to the antenna 430.

In some embodiments, the processing devices 410 may be coupled to the transceiver function 415 through serial signal lines via the external input/output function 425 instead of by a direct parallel data connection. The transceiver function 415 may itself comprise one or more processors and memory, in addition to circuits that are unique to radio functionality. In some embodiments, the transceiver 415 provides Bluetooth communications to another Bluetooth capable device. In some embodiments the separate functions described herein of the transceiver 415 and the processing devices 410 may be performed by a common processor or common processors. In some embodiments, the position sensor 150 is an electromechanical position sensor that is disposed at the rotational coupling 111 or alternative rotational coupling 112 and is electrically coupled to the earmount portion 125 of the earpiece 100. Position signals 451 electrically coupled from the position sensor 150 to the earmount portion 125 indicate at least when the earbud is in one of the right and left ear positions.

The processing devices 410 perform a digital signal processing function defined by program instructions 421 stored in memory 420 that can transform the plurality of the digitally converted analog microphone signals 461 according to one of a plurality of digital signal processes 422 stored in memory 420, each of which modifies one or more of the plurality of signals generated by the plurality of microphones 460 and combines them into one audio signal for transmission by the transceiver 415 and antenna 430. One of the plurality of digital signal processes 422 is selected by the processing devices 410 to be used for digital signal processing of the plurality of microphone signals 461 in response to a state of a position signal 451 from the position sensor 150. In some embodiments, the modification and combination may be simply a transform that turns one microphone on and turns another off. For example, in an embodiment in which the earpiece includes only right and left microphones 140, 145, the transform may be to turn on the right microphone 140 and turn off the left microphone 145 when the earbud 105 is in the right ear position and turn off the right microphone 140 and turn on the left microphone 145 when the earbud 105 is in the right ear position. In another example, the digital signal process selected by the state of the position signal 451 may process the audio signal from one of microphones 140, 145 as a primary signal (one that contains a high proportion of audio energy that is speech) and the audio signal from the other of microphones 140, 145 as secondary signal (one that includes a high proportion of energy that is non-speech (i.e., that is ambient noise), and combines the two signals in a noise cancelling manner, using conventional techniques, in response to one of two states of the position sensor 150. In some embodiments, conventional noise cancelling techniques may be used to transform signals from three or more microphones, such as microphones 135, 140, 145, to optimize speech audio in the resulting audio signal that is transmitted by the transceiver 415 and antenna 430. In certain of these embodiments, the signal from one microphone, such as microphone 135 may be transformed identically for some or all sensed positions before being combined with the signals from other microphones.

Certain of the embodiments described with reference to FIGS. 1-4 may be described as an apparatus 100 comprising an earmount portion 125 that is capable of positioning the apparatus 100 at an ear of a user, an earbud 105 that is movable to a selected position that is one of at least a left ear (FIG. 3) and a right ear (FIG. 2) position, an earbud position sensor 150 that detects the selected position, a plurality of microphones 460, and a digital signal processing function that selects one of a plurality of digital signal processes 422 in response to the selected position and uses the selected one of the digital signal processes to process audio signals 461 from the plurality of microphones 460. In some of these embodiments the earmount portion 125 comprises a left and right microphone 140, 145. A right digital signal process is selected when the selected position is a right ear position. The right digital signal process processes audio from the right microphone 140 as primary audio. A left digital signal process is selected when the selected position is a left ear position. The left digital signal process processes audio from the left microphone 145 as primary audio.

Figure 5:
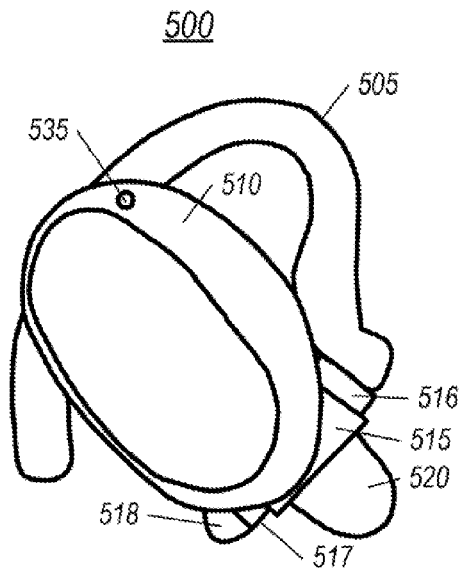
FIGS. 5-7 are outline drawings of a second wireless communication earpiece.
Figure 6:
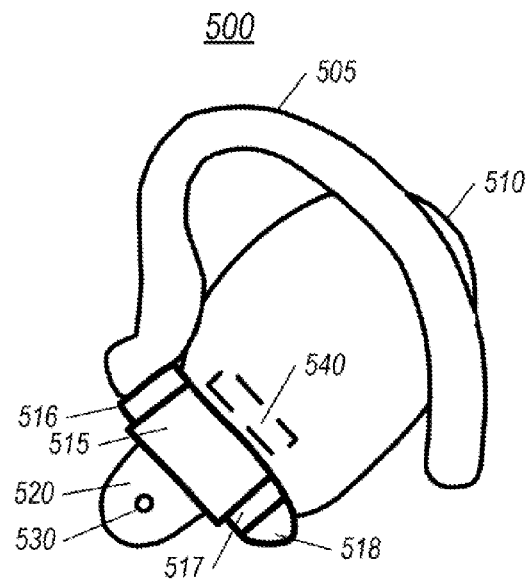
Figure 7:
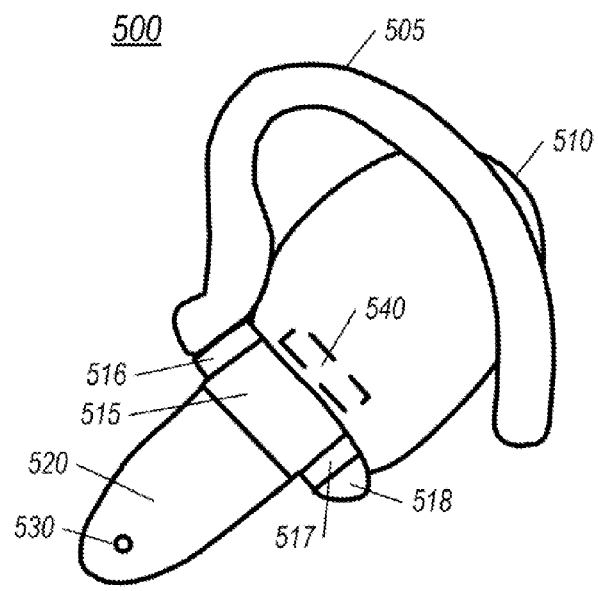

Referring to FIGS. 5-7, outline diagrams of a wireless communication earpiece 500 are shown, in accordance with certain embodiments. The earpiece 500 is one that has been configured for usage on a right ear. In FIG. 5 the view is a perspective from the right front of the earpiece 500. In FIGS. 6-7 the view is a perspective from the left rear of the earpiece 500. The earpiece 500 comprises an earmount 505. Similarly to the earpiece 100, the earmount 505 may have the configuration shown or an alternative configuration that provides for mounting the earpiece 500 to the ear of a user so that it is in a substantially fixed position relative to the ear and head of the user. E.g., the earmount 505 could be more wire like or more flat when viewed in a section along a longitudinal axis of the earmount 500, or may have portions that extend to the features of the outer ear in addition to portions behind the earlobe. The earpiece 500 further comprises an electronics portion 510 and a boom 520. The boom 520 in the embodiment shown in FIGS. 5-7 is designed to be movable to one of at least two selectable positions relative to the earmount 505. In the embodiment shown in FIGS. 5-7 the boom 520 extends from a housing of the electronics portion, and is therefore movable with reference to the electronics portion 510 and the earmount 505. Although the electronics portion 510 in the embodiment shown in FIGS. 5-7 is fixed relative to the earmount 505 and is disposed to be on the outside of the earlobe, some of the electronics for the earpiece 500 could be alternatively disposed inside the earmount 505. In these embodiments, the boom 520 is also designed to be movable with reference to the earmount 505. The boom 520 has at least a retracted position as shown in FIGS. 5-6 and an extended position as shown in FIG. 7 that are sensed by a position sensor 540, which is shown in dotted lines in FIGS. 6-7 because it is within the electronics portion 510. The boom 520 may have one or more positions between the retracted and extended positions that are also sensed by the position sensor 540.

The electronics portion 510 may further comprise a post 515 or similar housing feature that provides for attachment of the earmount 505 to the electronics portion in one of two configurations: right ear and left ear. In the right ear configuration shown in FIGS. 5-7, the earmount 505 is mechanically affixed to a first end 516 of the post 515 and a cover 518 is affixed to second end 517 of the post 515. In the left ear configuration, the earmount 505 would be mechanically affixed to the second end 517 of the post 515 and the cover 518 would be affixed to the first end 517 of the post 515. In either configuration, it will be appreciated that the boom is movable with reference to the earmount 505. The boom comprises a microphone 530 on the surface of the boom this is near the face of the user when the earpiece is mounted on the ear of the user. This is visible in FIGS. 6-7. In some embodiments, one or more other microphones may be disposed on the earpiece 500. One example is microphone 535, shown as being disposed on a top surface of the electronics portion 510.

Referring back to FIG. 4, the electronic block diagram for the earpiece 500 may be the same as the electronic block diagram for the earpiece 100. The earpiece 500 comprises an electronics module 405 which may provide the same type of functions as the electronics module 405 described with reference to FIG. 4 for earpiece 100, but with differences in the digital signal processes 421 used for the earpiece 500 with reference to the digital signal processes 421 used for the earpiece 100 due to the differing mechanical configuration of the two earpieces 100, 500. The electronics module 405 and a battery 440 for the earpiece 500 are disposed in the electronics portion 510 of earpiece 500 in the embodiment shown in FIGS. 5-7, but could be located elsewhere (such as the earmount 505, as described above). An antenna 430 for the earpiece 500 is disposed on the earpiece 500, for example on a surface of the electronics portion 510. The position sensor 540 provides electrical signals 451 that indicate the selection position of the boom 520. One or more microphones 460 are disposed on the earpiece 500, such as microphones 530, 535. The electronics module 405 processes the signals from the position sensor 540 and the plurality of microphones 460 of the earpiece 500 in the same manner as described for earpiece 100, except that earpiece 500 may in some embodiments have only one microphone for which the audio signal is transformed (but not combined with other microphone signals). For an embodiment with one microphone 530, a digital signaling process may have a first predetermined gain for the retracted position and a second predetermined gain for the extended position. For an embodiment with two microphones 530, 535 he digital signal process may have a first predetermined gain for the signal from microphone 530 in the retracted position and a second predetermined gain for the signal from microphone 530 in the extended position and then combine the signal from the microphone 530 that has been gain adjusted with the signal from the microphone 535 using noise cancelling techniques. It will be appreciated that more complex transforms could be used. For example, the signal from the microphone 530 could be modified with different transfer functions (frequency dependent gain functions) to account for the frequency differences in signals that are received when the microphone 530 is retracted versus when the microphone 530 is extended.

Certain of the embodiments described with reference to FIGS. 5-7 may be described as an apparatus 500 comprising an earmount portion 505 that is capable of positioning the apparatus 500 at an ear of a user, a boom 520 that is movable to a selected position that is one of at least a retracted position and an extended position, a boom position sensor 540 that detects the selected position, at least one microphone 460, and a digital signal processing function 420. The digital signal processing function 420 selects one of at least a retracted digital signal process and an extended digital signal process in response to the selected position and uses the selected one of the retracted and extended digital signal processes to process audio signals 461 from the at least one microphone 460.

Certain embodiments described with reference to FIGS. 1-7 may collectively be described as an apparatus 100, 500 comprising an earmount portion 125, 505 that is capable of positioning the apparatus 100, 500 at an ear of a user, a movable portion 105, 520 that is movable to one of a plurality of positions with reference to the earmount portion 125, 505, a position sensor 150, 540 that detects a selected position of the plurality of positions of the earmount portion 125, 505, a plurality of microphones 460; and a digital signal processing function 420. The digital signal processing function 420 selects one of a plurality of digital signal processes 421 in response to the selected position and uses the selected one of the digital signal processes 421 to process audio signals 461 from the plurality of microphones 460.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
   an earmount portion that is capable of positioning the apparatus at an ear of a user;
   an earbud that is movable to a selected position that is one of at least a left ear and a right ear position;
   an earbud position sensor that detects the selected position;
   a plurality of microphones; and
   a digital signal processing function that selects one of a plurality of digital signal processes in response to the selected position and uses the selected one of the digital signal processes to process audio signals from the plurality of microphones.

2. The apparatus according to claim 1, wherein the earmount portion comprises a left and right microphone, and wherein a right digital signal process is selected when the selected position is a right ear position, and wherein the right digital signal process processes audio from the right microphone as primary audio, and wherein a left digital signal process is selected when the selected position is a left ear position, and wherein the left digital signal process processes audio from the left microphone as primary audio.

3. The apparatus according to claim 2, wherein the earbud portion includes at least one earbud microphone, and wherein the right digital signal process and the left digital signal process audio from the earbud microphone with a same transform function when the earbud is in the right and the left ear positions.

4. An apparatus, comprising:
   an earmount portion that is capable of positioning the apparatus at an ear of a user;
   a movable portion that is movable to one of a plurality of positions with reference to the earmount portion;
   a position sensor that detects a selected position of the plurality of positions of the earmount portion;
   a plurality of microphones; and
   a digital signal processing function that selects one of a plurality of digital signal processes in response to the selected position and uses the selected one of the digital signal processes to process audio signals from the plurality of microphones.

* * * * *